(12) United States Patent
Park et al.

(10) Patent No.: US 8,556,548 B2
(45) Date of Patent: Oct. 15, 2013

(54) TOOL HOLDER CLAMP ASSEMBLY FOR CUTTING INSERTS AND ITS PRESSING PLATE

(75) Inventors: Hong Sik Park, Daegu (KR); Sung Hyup Park, Daegu (KR); Chang Hee Choi, Daegu (KR)

(73) Assignee: TaeguTec, Ltd., Dalsung-Gun, Daegu (KR)

( * ) Notice: Subject to any disclaimer, the term of this patent is extended or adjusted under 35 U.S.C. 154(b) by 179 days.

(21) Appl. No.: 13/230,523

(22) Filed: Sep. 12, 2011

(65) Prior Publication Data

US 2012/0003053 A1    Jan. 5, 2012

Related U.S. Application Data

(63) Continuation-in-part of application No. PCT/KR2009/001265, filed on Mar. 13, 2009.

(51) Int. Cl.
*B23B 27/16* (2006.01)

(52) U.S. Cl.
USPC .......................................... 407/107

(58) Field of Classification Search
USPC ................ 407/2, 5, 3, 4, 6, 100, 107, 115
See application file for complete search history.

(56) References Cited

U.S. PATENT DOCUMENTS

| 3,045,322 A * | 7/1962 | Hertel ................................ 407/3 |
| 3,268,977 A | 8/1966 | Diemond |
| 3,500,523 A | 3/1970 | Cashman et al. |
| 3,550,230 A * | 12/1970 | Huppe et al. ....................... 407/4 |
| 5,820,311 A * | 10/1998 | Grun et al. ...................... 407/102 |
| 6,146,062 A * | 11/2000 | Jansson .......................... 407/107 |
| 6,394,709 B1 * | 5/2002 | Sjoo et al. ........................... 407/2 |
| 6,991,410 B2 * | 1/2006 | Andras et al. ................. 407/107 |
| 7,261,496 B2 * | 8/2007 | Zitzlaff ......................... 407/107 |
| 2004/0256608 A1 | 12/2004 | Eder et al. |

FOREIGN PATENT DOCUMENTS

| EP | 143569 A1 * | 6/1985 |
| FR | 2330483 A1 | 6/1977 |
| GB | 1098124 A | 1/1968 |
| GB | 1171868 A | 11/1969 |
| RU | 2087266 C1 * | 8/1997 |
| SU | 797845 A1 | 1/1981 |

OTHER PUBLICATIONS

Official Action dated Oct. 26, 2012 issued in Chinese counterpart application (No. 200980158055.2).

(Continued)

*Primary Examiner* — Daniel Howell
*Assistant Examiner* — Nicole N Ramos
(74) *Attorney, Agent, or Firm* — Womble Carlyle

(57) ABSTRACT

A clamp fastens a cutting insert to a tool holder. The clamp assembly includes a body portion provided with a screw hole, a forward protrusion formed at the front portion of the body and extending downward, a rear protrusion formed at the rear end portion of the body and extending downward, and a bridge connecting the forward protrusion and the central portion of the body. The clamp assembly also includes a pressing plate having upper and lower surfaces, a front nose portion, a rear end portion, and is provided with a keyhole shaped groove having an enlarged inner cavity open toward the rear end by a narrow neck extending thicknesswise. The forward protrusion is inserted into the enlarged inner cavity and the bridge is inserted into the narrow neck of the keyhole groove so that the pressing plate is coupled to the clamp.

17 Claims, 4 Drawing Sheets

(56) References Cited

OTHER PUBLICATIONS

Extended European search report dated Sep. 6, 2012 issued in EP counterpart application (No. 09841541.7).

International Search Report in PCT/KR2009/001265, filed Dec. 4, 2009.
Written Opinion in PCT/KR2009/001265, filed Dec. 4, 2009.

* cited by examiner

TOOL HOLDER CLAMP ASSEMBLY FOR CUTTING INSERTS AND ITS PRESSING PLATE

RELATED APPLICATIONS

This is a Continuation-in-part of International Application No. PCT/KR2009/001265, filed 13 Mar. 2009 and published as WO 2010/104227A1 on 16 Sep. 2010. The contents of the above-identified international application are incorporated by reference in their entirety.

TECHNICAL FIELD

This disclosure is related to a tool holder clamp assembly for cutting inserts using a pressing plate.

BACKGROUND ART

In tool holders for machining a work-piece, especially for turning applications, the clamping force upon inserts is often insufficient so that small movements of the inserts in the pocket during machining causes the tool life to decrease and sometimes leads to the breakage of inserts. In addition, chips generated during machining are impinged onto the clamp with high pressure so that the clamp is severely worn out; therefore the tool life decreases rapidly. To solve this problem, clamps engaged with pressing plates formed of a hard material are proposed for use in tool holders.

However, since conventional clamp plates are fastened to the clamps by separate screws and connecting plates, handling is inconvenient and the number of parts is increased. Also, since additional thread tab machining is needed, there is an extra machining cost and breakage may occur due to the weakened portion by the tab. In addition, there is a structural weakness against the rotational movement of the clamp plate.

SUMMARY

The present disclosure aims to provide a clamp assembly and a tool holder which creates an excellent clamping force by using a pressing plate having a simple structure, and which also allows easy coupling of the pressing plate.

A pressing plate for a clamp configured to fasten a cutting insert to a tool holder pocket according to the present disclosure comprises upper and lower surfaces, a front nose portion, and a rear end portion, and is provided with a keyhole shaped groove having an enlarged inner cavity open toward the rear end by a narrow neck extending thicknesswise.

A clamp assembly for fastening a cutting insert to a tool holder according to the present disclosure comprises: a clamp comprising a body portion provided with a screw hole for a clamping screw to pass through, a forward protrusion formed at the front portion of the body and extending downward, a rear protrusion formed at the rear end portion of the body and extending downward, and a bridge connecting the forward protrusion and the central portion of the body, and the pressing plate described above. The forward protrusion is inserted into the enlarged inner cavity and the bridge is inserted into the narrow neck of the keyhole groove so that the pressing plate is coupled to the clamp.

The clamp assembly according to the present disclosure may have a pressing plate whose front nose portion has a curved surface slanted downwardly from the upper surface to the lower surface and whose rear end portion comprises a vertical flat surface.

The pressing plate according to the present disclosure may have a reinforcing protrusion formed on the upper surface around the enlarged inner cavity.

The pressing plate according to the present disclosure may have a pin receiving depression formed near the rear end on the lower surface across the narrow neck.

The clamp assembly according to the present disclosure may further comprise a fixing pin, and a pin hole formed across the bridge of the clamp, wherein the fixing pin is inserted into the pin hole and received in the pin receiving depression.

The clamp assembly using the pressing plate according to the present disclosure allows easy handling and a smaller number of parts. Also, the forward protrusion is structurally reinforced by a bridge and the life time of the clamp is greatly extended. Also, rotation of the pressing plate in the clamp is prevented. The structural strength of the pressing plate is reinforced and the clamping force is increased by transferring the pressing force more uniformly to the upper surface of the insert. The present disclosure allows various types of inserts to be mounted in the same tool holder regardless of insert-hole shapes, by changing the clamp and the pressing plate.

DETAILED DESCRIPTION

Hereinafter, pressing plates, clamp assemblies engaged with the pressing plates, and tool holders with inserts clamped by the clamp assemblies according to embodiments of the present disclosure are described. The figures attached to the present disclosure are merely for convenience of explanation, and the shapes and the relative scales may be exaggerated or abridged.

Figure 1:
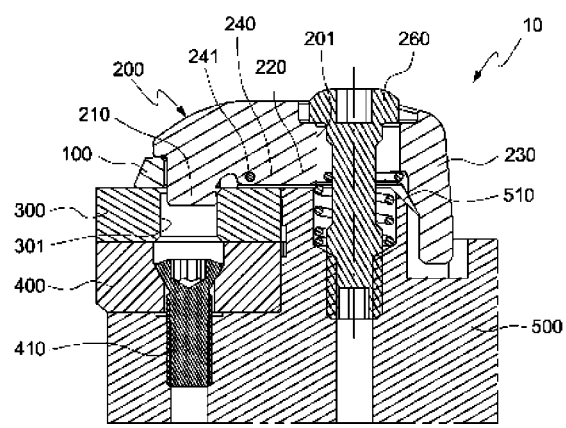
FIG. 1 is a sectional view depicting a tool holder assembly in accordance with the present disclosure.
Figure 2:
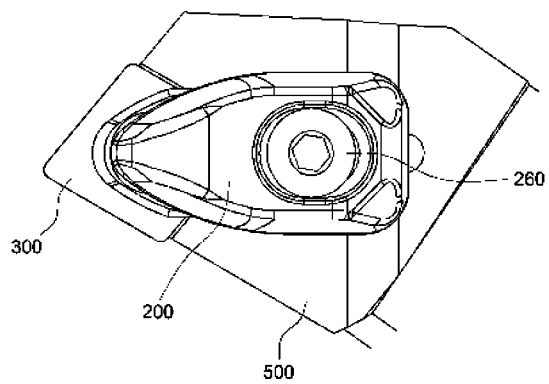
FIG. 2 is a planar view of the tool holder assembly of FIG. 1.

FIG. 1 is a sectional view depicting a tool holder assembly in accordance with the present disclosure and FIG. 2 is a planar view of the tool holder assembly of FIG. 1. In the tool holder assembly of FIG. 1, a cutting insert 300 with a central hole 301 is clamped to a tool holder 500 using a clamp 200. Generally, the cutting insert 300 is mounted on a shim plate 400 which is fastened to the tool holder 500 by a screw 410.

Figure 3:
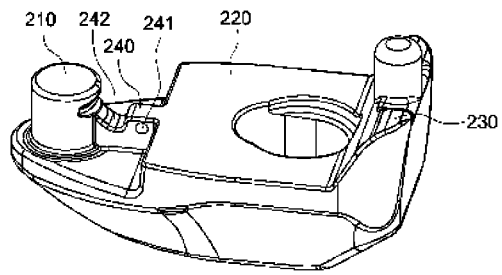
FIG. 3 is a perspective view depicting a clamp in accordance with the present disclosure.

FIG. 3 is a perspective view depicting a clamp in accordance with the present disclosure. The clamp 200 comprises a body provided with a screw hole 201 for a clamping screw 260 to pass through, a forward protrusion 210 formed at the front portion of the body, extending downward and received in the central hole 301 of the insert 300, a rear protrusion 230 formed at the rear portion of the body, extending downward and having a rear contact surface configured to come in contact with a rearward slanting surface 510 of the tool holder 500, and a bridge 240 connecting the forward protrusion 210 and the central portion 220 of the body. The bridge 240 reinforces the structural strength of the forward protrusion 210, which is structurally weak, and prevents breakage during machining. As shown in FIG. 3, the bridge 240 may have a cutout 242 formed on the border to the forward protrusion 210 to alleviate the stress concentration buildup at the border portion.

Figure 4:
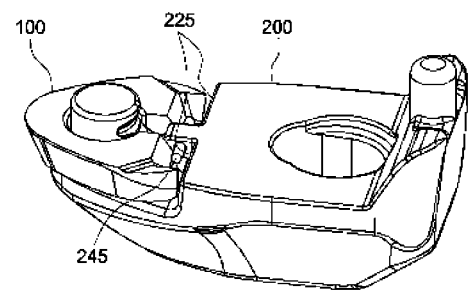
FIG. 4 is a perspective view depicting a clamp assembly in accordance with the present disclosure.

FIG. 4 is a perspective view depicting a clamp assembly in accordance with the present disclosure. The clamp assembly is assembled by coupling a pressing plate 100 to a clamp 200.

Figure 5:
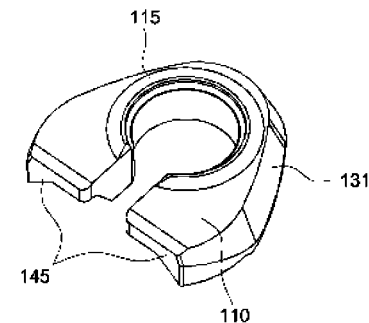
FIGS. 5 and 6 are perspective views depicting a pressing plate in accordance with the present disclosure.
Figure 6:
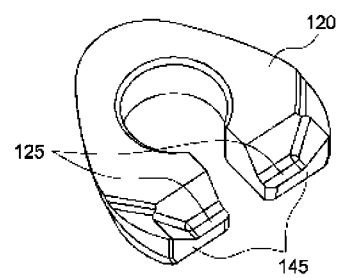
Figure 7:
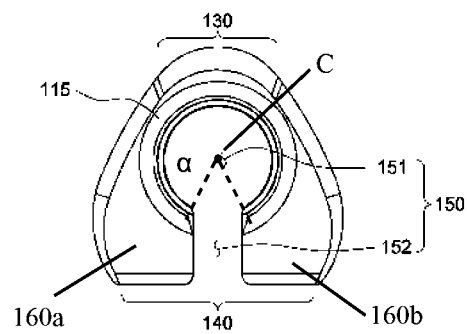
FIG. 7 is a planar view of the pressing plate shown in FIGS. 5 and 6.

FIGS. 5 and 6 are perspective views depicting a pressing plate in accordance with the present disclosure at different angles, and FIG. 7 is a corresponding planar view. The pressing plate 100 is used for a clamp 200 fastening a cutting insert to a tool holder pocket. The pressing plate 100 comprises upper and lower surfaces 110,120, a front nose portion 130, and a rear end portion 140, and is provided with a keyhole shaped groove 150 having an enlarged inner cavity 151 open toward the rear end by a narrow neck 152 extending thicknesswise. As best seen in FIG. 7, the rear end portion 140 comprises two spaced apart rear lobes 160a, 160b which are separated by the narrow neck 152 of the keyhole shaped groove 140.

The pressing plate is made of a super hard material to resist wear and endure for a long time. The pressing plate also allows the pressing force of the clamp to transfer strongly to a large area of the upper surface of the insert.

The forward protrusion 210 of the clamp is inserted into the enlarged inner cavity 151 of the pressing plate and the bridge 240 of the clamp is inserted into the narrow neck 152 of the keyhole groove 150 so that the pressing plate 100 is coupled to the clamp 200 to form a clamp assembly.

In the pressing plate, the front nose portion 130 may have a curved surface 131 slanted downwardly from the upper surface 110 to the lower surface 120 for smooth chip evacuation and the rear end portion 140 may comprise a vertical flat surface 145. The pressing plate may have a reinforcing protrusion 115 formed on the upper surface 110 around the enlarged inner cavity 151. This reinforces the structural strength of the pressing plate and also transfers the pressing force more uniformly to the upper surface of the insert. As seen in FIG. 7, the reinforcing protrusion 115 may subtend a circumferential angle α of at least 240° around a center C of the enlarged inner cavity 151. The pressing plate may have a pin receiving depression 125 which is formed near the rear end 140 on the lower surface 120 across the narrow neck 152.

The underside of the clamp may be provided with a vertical support surface 225 which corresponds to the vertical flat surface 145 of the pressing plate 100. Therefore, if contact is made between the vertical flat surface 145 and the vertical support surface 225, the contact prevents rotation of the pressing plate in the clamp and reduces the rotational force applied on the bridge. The reinforcing protrusion 115 of the pressing plate 100 comes in contact with the underside of the front portion of the clamp body around the forward protrusion 210.

The clamp 200 may be provided with a pin hole 241 formed across the bridge 240. The clamp assembly may further comprise a fixing pin 245, and the fixing pin 245 is inserted into the pin hole 241 and received in the pin receiving depression 125 so that the clamp assembly is integrally engaged with a pressing plate. Generally the fixing pin is spring steel having a straight shape and allows elastic coupling to the pin hole 241.

The clamp assembly using the pressing plate 200 according to the present disclosure allows simple fixing by means of one fixing pin 245 without using any other fastening means such as screws so that handling is easier and the number of parts is reduced. Also, since the forward protrusion 210, which is structurally weak, is structurally reinforced by a bridge 240, the life time of the clamp is greatly extended. The vertical flat surface 145 of the pressing plate has the effect of preventing rotation of the pressing plate in the clamp and reducing the rotational force applied on the bridge 240. The reinforcing protrusion 115 of the pressing plate reinforces the structural strength of the pressing plate and also increases the clamping force by transferring the pressing force more uniformly onto the upper surface of the insert 300.

Figure 8:
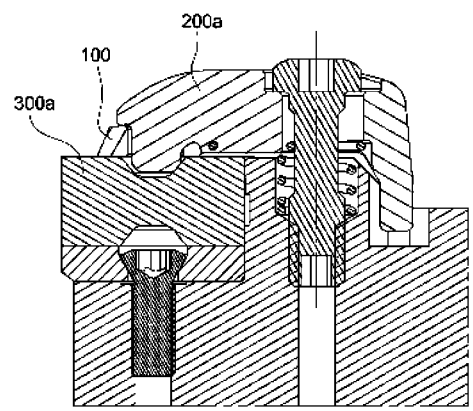
FIGS. 8 and 9 are sectional views depicting alternative embodiments of tool holder assemblies in accordance with the present disclosure.
Figure 9:
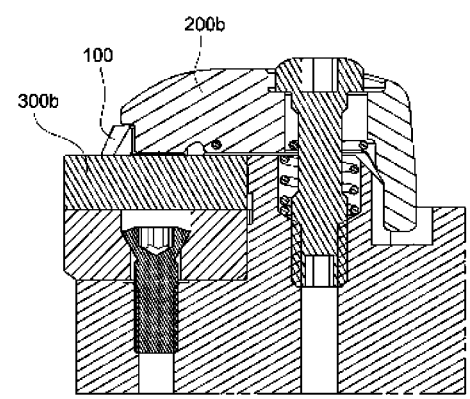

The present disclosure allows various types of inserts to be mounted in the same tool holder, regardless of their shapes, by changing only the clamp and the pressing plate. For example, although the tool holder of FIG. 1 is described for a cutting insert with a vertically pierced clamping hole, the concept of the present disclosure may be applied to tool holders configured to clamp inserts with a central dimple or flat inserts without holes 300a, 300b as shown in FIGS. 8 and 9, respectively. In these embodiments, the same pressing plate 100 may be used for securing various types of inserts 300a, 300b to the tool holder having the same pocket shape with only a slight difference in the length and shape of the forward protrusion of the clamp 200a, 200b.

The tool holder assemblies using the clamp assemblies disclosed above may have various other embodiments without departing from the basic concept of the present disclosure. Accordingly, all the disclosed embodiments must be understood as being exemplary only and must not be construed to be the limit of the present disclosure. Accordingly, the range of protection for the present disclosure must be determined not by an embodiment described hereinabove, but by the attached claims. An alternative that is equivalent to the attached claims is included in the range of protection of the attached claims.

What is claimed is:

1. A pressing plate for a clamp configured to fasten a cutting insert to a tool holder pocket, wherein the pressing plate comprises upper and lower surfaces, a front nose portion, and a rear end portion, and is provided with a keyhole shaped groove having an enlarged inner cavity open toward the rear end by a narrow neck extending thicknesswise;
   wherein a reinforcing protrusion is formed on the upper surface around the enlarged inner cavity.

2. The pressing plate according to claim 1, wherein the front nose portion has a curved surface slanted downwardly from the upper surface to the lower surface and the rear end portion comprises a vertical flat surface.

3. A pressing plate for a clamp configured to fasten a cutting insert to a tool holder pocket, wherein the pressing plate comprises upper and lower surfaces, a front nose portion, and a rear end portion, and is provided with a keyhole shaped groove having an enlarged inner cavity open toward the rear end by a narrow neck extending thicknesswise;
   wherein a pin receiving depression is formed near the rear end on the lower surface across the narrow neck.

4. The pressing plate according to claim 3, wherein a reinforcing protrusion is formed on the upper surface around the enlarged inner cavity.

5. The pressing plate according to claim 3, wherein the front nose portion has a curved surface slanted downwardly from the upper surface to the lower surface and the rear end portion comprises a vertical flat surface.

6. A clamp assembly for fastening a cutting insert to a tool holder, wherein the clamp assembly comprises:
   a clamp comprising a body portion provided with a screw hole for a clamping screw to pass through, a forward protrusion formed at the front portion of the body and extending downward, a rear protrusion formed at the rear end portion of the body and extending downward, and a bridge connecting the forward protrusion and the central portion of the body; and a pressing plate comprising upper and lower surfaces, a front nose portion, and a rear end portion, and being provided with a keyhole shaped groove having an enlarged inner cavity open toward the rear end by a narrow neck extending thicknesswise, wherein the forward protrusion is inserted into the enlarged inner cavity and the bridge is inserted into the narrow neck of the keyhole groove so that the pressing plate is coupled to the clamp.

7. The clamp assembly according to claim 6, wherein the rear end portion of the pressing plate comprises a vertical flat surface and the underside of the clamp is provided with a vertical support surface which corresponds to the vertical flat surface of the pressing plate.

8. The clamp assembly according to claim 6, wherein a reinforcing protrusion is formed on the upper surface of the pressing plate around the enlarged inner cavity, and the reinforcing protrusion comes in contact with the underside of the front portion of the clamp body.

9. The clamp assembly according to claim 6, wherein the bridge of the clamp has a cutout formed on the border portion with the forward protrusion.

10. The clamp assembly according to claim 6, wherein the clamp assembly further comprises a fixing pin, and a pin receiving depression is formed across the narrow neck near the rear end on the lower surface of the pressing plate, a pin hole is formed across the bridge of the clamp, and the fixing pin is inserted into the pin hole and received in the pin receiving depression.

11. A tool holder assembly comprising the clamp assembly according to claim 6.

12. A pressing plate suitable for positioning between a clamp and an upper surface of a cutting insert to facilitate clamping the cutting insert in a tool holder pocket, the pressing plate comprising:
   upper and lower surfaces;
   a front nose portion;
   a rear end portion comprising two spaced apart rear lobes; and
   a keyhole shaped groove extending between the upper and lower surfaces, the keyhole shaped groove having an enlarged inner cavity connected to a narrow neck which forms an opening in the rear end portion and separates the two rear lobes; wherein:
   a reinforcing protrusion is formed on the upper surface around the enlarged inner cavity, the reinforcing protrusion subtending a circumferential angle of at least 240° of the enlarged inner cavity relative to a center thereof.

13. The pressing plate according to claim 12, wherein the front nose portion has a curved surface slanted downwardly from the upper surface to the lower surface and the rear end portion comprises a vertical flat surface.

14. A pressing plate suitable for positioning between a clamp and an upper surface of a cutting insert to facilitate clamping the cutting insert in a tool holder pocket, the pressing plate comprising:
   upper and lower surfaces;
   a front nose portion;
   a rear end portion comprising two spaced apart rear lobes; and
   a keyhole shaped groove extending between the upper and lower surfaces, the keyhole shaped groove having an enlarged inner cavity connected to a narrow neck which forms an opening in the rear end portion and separates the two rear lobes;
   wherein a pin receiving depression is formed near the rear end on the lower surface, the pin receiving depression extending on both sides of the narrow neck.

15. The pressing plate according to claim 14, wherein:
   a reinforcing protrusion is formed on the upper surface around the enlarged inner cavity, the reinforcing protrusion subtending a circumferential angle of at least 240° of the enlarged inner cavity relative to a center thereof.

16. The pressing plate according to claim 14, wherein the front nose portion has a curved surface slanted downwardly from the upper surface to the lower surface and the rear end portion comprises a vertical flat surface.

17. A pressing plate suitable for positioning between a clamp and an upper surface of a cutting insert to facilitate clamping the cutting insert in a tool holder pocket, the pressing plate comprising:
   upper and lower surfaces;
   a front nose portion;
   a rear end portion comprising two spaced apart rear lobes; and
   a keyhole shaped groove extending between the upper and lower surfaces, the keyhole shaped groove having an enlarged inner cavity connected to a narrow neck which forms an opening in the rear end portion and separates the two rear lobes; wherein:
   a reinforcing protrusion is formed on the upper surface around the enlarged inner cavity, the reinforcing protrusion subtending a circumferential angle of at least 240° of the enlarged inner cavity relative to a center thereof;
   the front nose portion has a curved surface slanted downwardly from the upper surface to the lower surface and the rear end portion comprises a vertical flat surface; and
   a pin receiving depression is formed near the rear end on the lower surface, the pin receiving depression extending on both sides of the narrow neck.

* * * * *